United States Patent
Cherolis et al.

(10) Patent No.: US 6,951,447 B2
(45) Date of Patent: Oct. 4, 2005

(54) TURBINE BLADE WITH TRAILING EDGE PLATFORM UNDERCUT

(75) Inventors: Anthony Cherolis, East Hartford, CT (US); Wieslaw A. Chlus, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 105 days.

(21) Appl. No.: 10/738,288

(22) Filed: Dec. 17, 2003

(65) Prior Publication Data

US 2005/0135936 A1 Jun. 23, 2005

(51) Int. Cl.$^7$ .................................................. F01D 5/14
(52) U.S. Cl. .................................................. 416/193 A
(58) Field of Search ...................... 416/193 A, 189, 416/190, 193 R, 244 A, 248, 500; 29/889.1, 29/899.7

(56) References Cited

U.S. PATENT DOCUMENTS

| | | | |
|---|---|---|---|
| 5,387,086 A | 2/1995 | Frey et al. | |
| 5,688,107 A | 11/1997 | Downs | |
| 6,390,775 B1 | 5/2002 | Paz | |
| 6,490,791 B1 | 12/2002 | Surace | |
| 6,607,355 B2 | 8/2003 | Cunha | |
| 6,761,536 B1 * | 7/2004 | Bash et al. | 416/193 A |
| 2004/0213672 A1 * | 10/2004 | Gautreau et al. | 416/190 |

FOREIGN PATENT DOCUMENTS

| | | |
|---|---|---|
| EP | 0 851 097 | 7/1998 |
| EP | 1 128 024 | 8/2001 |
| GB | 1 190 771 | 5/1970 |

OTHER PUBLICATIONS

European Search Report, Mar. 10, 2005.

* cited by examiner

Primary Examiner—Edward K. Look
Assistant Examiner—Richard A. Edgar
(74) Attorney, Agent, or Firm—Carlson,Gaskey & Olds

(57) ABSTRACT

A turbine blade has an undercut beneath its platform at a trailing edge. The undercut has a complex shape to move thermal stress concentration away from the platform. A preferred undercut shape has a pair of curved fillets at upper and lower extents of the undercut with an intermediate straight section. The intermediate straight section is preferably parallel to a principle stress field of the platform.

27 Claims, 2 Drawing Sheets

TURBINE BLADE WITH TRAILING EDGE PLATFORM UNDERCUT

BACKGROUND OF THE INVENTION

This invention relates to an undercut beneath the platform of a trailing edge of a turbine blade, wherein the undercut has a shape designed to move stress concentration away from the platform.

Turbine blades typically include a platform, with an airfoil extending outwardly of the platform. The airfoil and platform are exposed to thermal stress, as they come into contact with heated gasses. The thermal stresses create design challenges for the platform.

One method of reducing stress at the platform is the formation of an undercut at a trailing edge of the platform. The prior art undercut has generally been on a single radius. While the known undercut does reduce stress concentration, the single radius leaves a highly stressed area adjacent the portion of the radius merging into the platform.

SUMMARY OF THE INVENTION

In a disclosed embodiment of this invention, an undercut for a turbine blade platform is formed with a shape to move thermal stress away from the interface of the undercut to the platform. In a more preferred embodiment, the shape of the undercut includes an upper fillet and a lower fillet, with an intermediate section having less curvature than either the upper or lower fillets. In a most preferred embodiment, this intermediate section is essentially straight, and connects the two fillets. The straight section is preferably formed to be parallel to a principle stress field at the highest stress location in the platform. This moves a good deal of the stress to the lower fillet. This removal of the stress from the area where the undercut merges with the platform reduces the likelihood of stress corrosion, cracking and thermal mechanical fatigue.

These and other features of the present invention can be best understood from the following specification and drawings, the following of which is a brief description.

DETAILED DESCRIPTION OF THE PREFERRED EMBODIMENT

Figure 1:
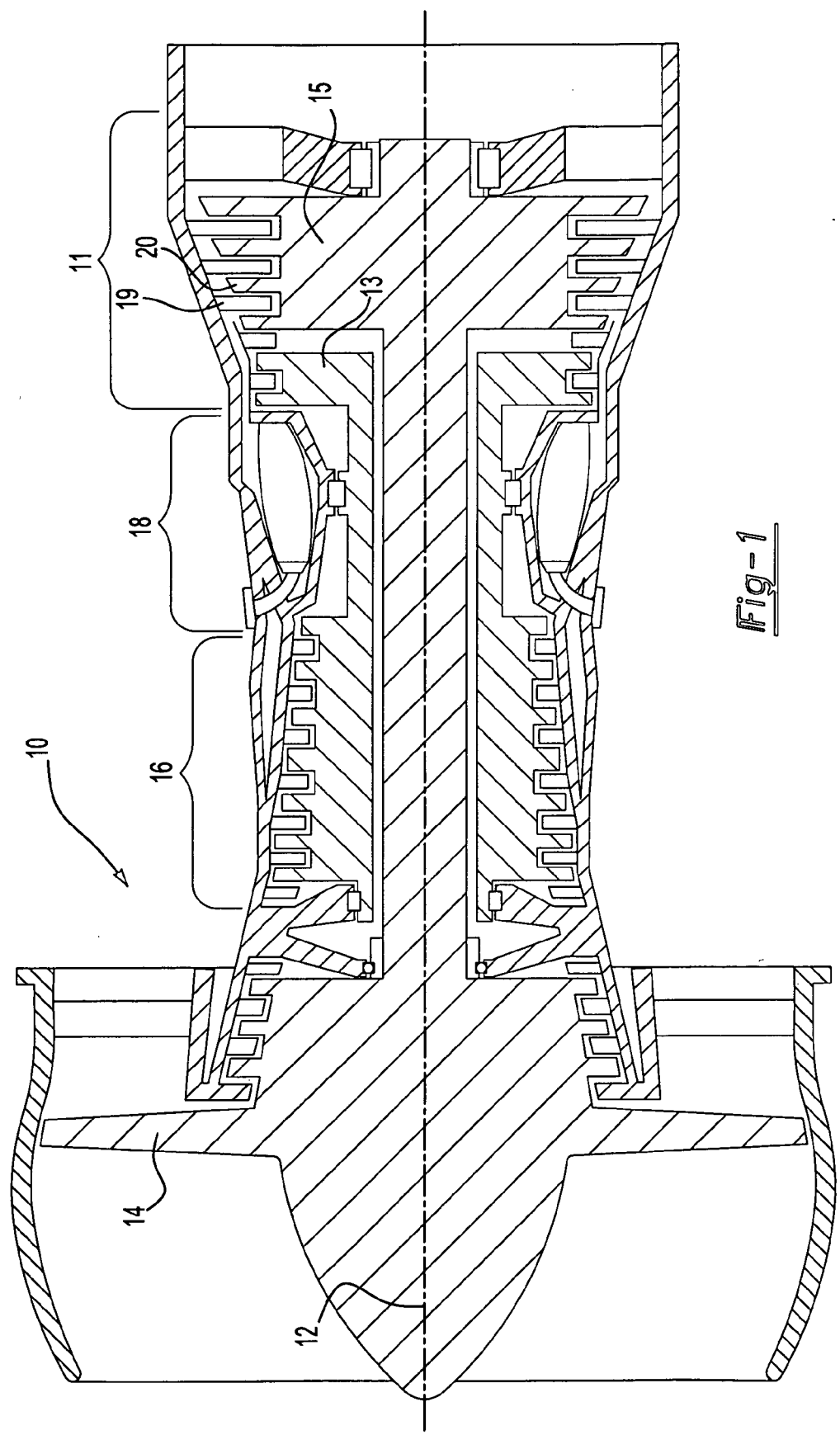
FIG. 1 shows a gas turbine engine.

As shown in FIG. 1, a gas turbine engine 10, such as a gas turbine used for power generation or propulsion, is circumferentially disposed about an engine centerline, or axial centerline axis 12. The engine 10 includes a fan 14, a compressor 16, a combustion section 18 and a turbine 11. As is well known in the art, air compressed in the compressor 16 is mixed with fuel which is burned in the combustion section 18 and expanded in turbine 11. The air compressed in the compressor and the fuel mixture expanded in the turbine 11 can both be referred to as a hot gas stream flow. The turbine 11 includes rotors 13 and 15 that, in response to the expansion, rotate, driving the compressor 16 and fan 14. The turbine 11 comprises alternating rows of rotary blades 20 and static airfoils or vanes 19. FIG. 1 is a somewhat schematic representation, for illustrative purposes only, and is not a limitation of the instant invention that may be employed on gas turbines used for electrical power generation and aircraft.

Figure 2:
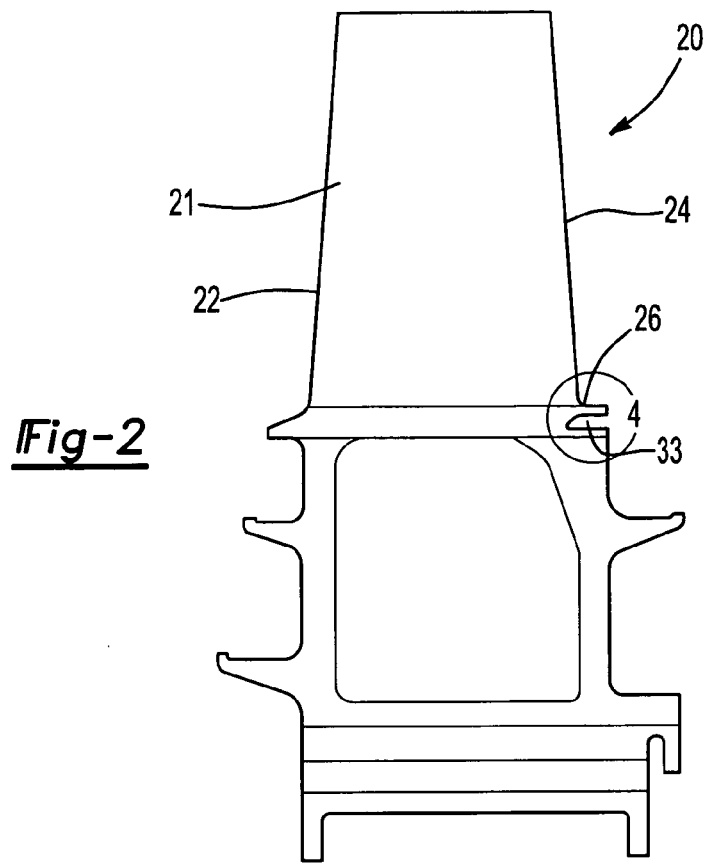
FIG. 2 shows a turbine blade.
Figure 3:
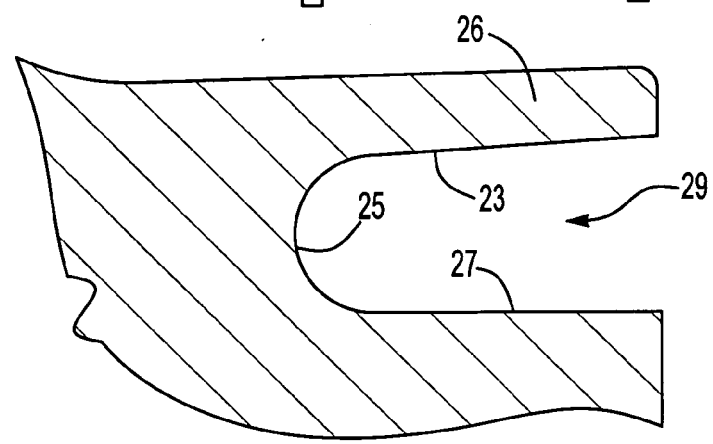
FIG. 3 shows a prior art undercut.

As shown in FIG. 2, turbine blade 20 has an airfoil portion 21 extending from a leading edge 22 to a trailing edge 24. A platform 26 supports the airfoil 21. An undercut 33 is shown beneath the platform 26 at the trailing edge 24. The prior art undercut 29 is shown in FIG. 3 as having a single radius portion 25 connecting a lower surface 23 of the platform 26 and an upper surface 27 of a base for the blade 20. The purpose of the prior art undercut is to reduce thermal stress concentration in the platform. However, the area where the single radius 25 merges with the bottom surface 23 of the platform 26 remains a high thermal stress area, and may be the highest thermal stress area in this prior art blade. Thus, although the undercut 29 does provide benefit in reducing heat stress at the platform, there is still the possibility of stress corrosion cracking and thermal mechanical fatigue.

Figure 4:
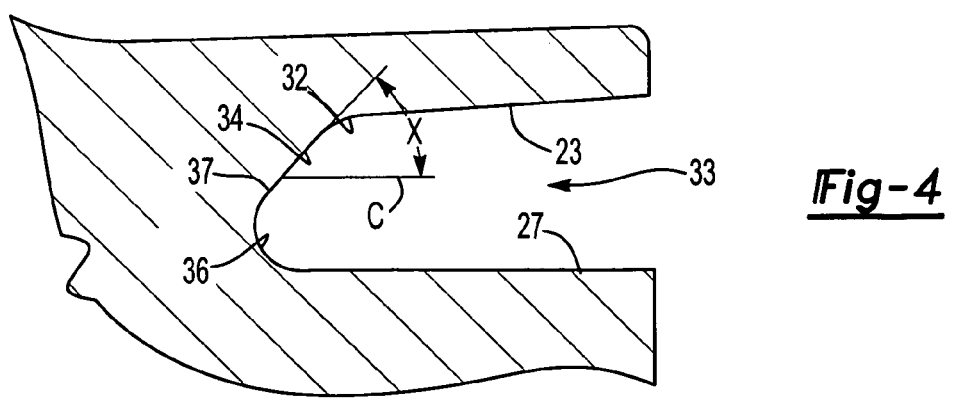
FIG. 4 shows the inventive undercut.

FIG. 4 shows an inventive undercut 33. Here, the undercut connecting the surfaces 23 and 27 includes three main areas. A first curve fillet 32 is formed at a first radius. A second, essentially flat or straight portion 34 is formed connecting the first fillet 32 to a second compound fillet 36. Compound fillet 36 begins at a point 37, and merges into surface 27. The compound fillet preferably extends along a transition radius. While the surface 34 is preferably identically straight, some small deviation from straight would also be within the scope of this invention. In a broad sense, one could say that the surface 34 has less curvature than the fillets 32 or 36 and is positioned intermediate the two fillets.

In a most preferred embodiment, the radius for the fillet 32 is greater than the greatest radius of compound fillet 36.

The straight surface 34 is formed at an angle X relative to a center line C of the undercut 33. Angle X is preferably defined parallel to a principal stress field of the platform. In one embodiment this angle was 47°. In this same embodiment, the radius of the fillet 32 is 0.115, and the radius of the fillet 36 changes from 0.1 at end 37 to 0.065 adjacent the surface 27.

The ratio between the radius of curvature for the fillet 32, and the radius of curvature for the fillet 36 at end 37 is preferably between 1 and 1.5. The ratio between the radius of curvature of fillet 32, and radius of curvature of fillet 36 adjacent to its opposed or bottom end is preferably 1.5 to 2.

The angle X and the principal stress field will change dependent upon several features, including the depth of the undercut slot cut into the platform. As the undercut becomes deeper, the angle X will become shallower. On the other hand, a shallow slot will result in a steeper angle. It is expected that the range of angles will be between 40° and 60°. A ratio could be defined between the total length of the axial platform, and the depth of the undercut. An appropriate range for this ratio will be on the order of 7 to 12, with one exemplary undercut having a ratio of platform length to undercut depth of 8.8.

The present invention, with its compound undercut shape, moves the area of highest thermal stress away from the upper fillet 32, and moves it to be adjacent the point 37. Since this is a cooler area of the blade 20, the likelihood of stress corrosion, cracking or thermal mechanical fatigue is reduced.

The present inventive undercut can also be utilized to refurbish airfoils having other type undercuts, or potentially even an airfoil with no undercut. The undercut will preferably be machined into the blade, and has a shape as shown in FIG. 4. A computer controlled milling machine can be used. When machined in this fashion, it is possible the undercut would be flat into and out of a plane of FIG. 4, which would be different than the typical undercut. The undercut as formed in a new blade would have some small curvature through the depth of the blade (i.e., into the plane of FIG. 4). However, to simplify machining, it may well be that this curvature would be ignored when cutting an undercut.

The method of refurbishing an air foil may incorporate an existing method wherein existing blades are cut back to blend out existing cracks. That is, when refurbishing a used blade, one may cut the inventive undercut into the blade along with a procedure for blending out any existing cracks. A method is generally described in U.S. Pat. No. 6,490,791 entitled "Method for Repairing Cracks in a Turbine Blade Root Trailing Edge."

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine blade comprising:
   a platform, and an airfoil extending outwardly of said platform, said airfoil having a leading edge and a trailing edge; and
   an undercut formed on an underside of said platform, spaced away from said airfoil, said undercut being on an end of said platform adjacent said trailing edge of said airfoil, and said undercut connecting said underside of said platform to a base of said blade, said undercut having a shape with three distinct sections, a first section adjacent said underside of said platform, a second section connecting said first section to a third section adjacent said base, and said first and third sections extending along a curve, and said second section having less curvature than said first and third sections.

2. A blade as set forth in claim 1, wherein said second section is essentially straight.

3. A blade as set forth in claim 2, wherein said second section extends parallel to a principle stress field in said platform.

4. A blade as set forth in claim 2, wherein said second section extends at an angle of between 40° and 60°, when measured from a center line of said undercut.

5. A blade as set forth in claim 1, wherein said third section is a compound curve with a changing radius.

6. A blade as set forth in claim 5, wherein said changing radius transitions from a greater radius to a smaller radius from a point connected to said second section, to a point that merges with said base.

7. A blade as set forth in claim 6, wherein said first section has a greater radius of curvature than said changing radii of said third section.

8. A blade as set forth in claim 7, wherein a ratio of said radius of curvature of said first section compared to said radius of curvature of said third section at said point connected to said second section is between 1 and 1.25.

9. A blade as set forth in claim 7, wherein a ratio of said radius of curvature of said first section compared to said radius of curvature of said third section at said point that merges into said base is between 1.5 and 2.0.

10. A turbine blade comprising:
    a platform, and an airfoil extending outwardly of said platform, said airfoil having a leading edge and a trailing edge; and
    an undercut formed on an underside of said platform, spaced away from said airfoil, said undercut being on an end of said platform adjacent said trailing edge of said airfoil, and said undercut connecting said underside of said platform to a base of said blade, said undercut having a shape with three distinct sections, a first section adjacent said underside of said platform, a second section connecting said first section to a third section adjacent said base, and said first and third sections extending along a curve with a radius of curvature of said first section being greater than a radius of curvature of said second section, and said second section being straight and extending parallel to a principal stress field in said platform.

11. A blade as set forth in claim 10, wherein said third section is a compound curve with a changing radius.

12. A blade as set forth in claim 11, wherein said changing radius transitions from a greater radius to a smaller radius from a point connected to said second section, to a point that merges with said base.

13. A blade as set forth in claim 12, wherein a ratio of said radius of curvature of said first section compared to said radius of curvature of said third section at said point connected to said second section is between 1 and 1.25.

14. A blade as set forth in claim 12, wherein a ratio of said radius of curvature of said first section compared to said radius of curvature of said third section at said point that merges into said base is between 1.5 and 2.0.

15. A blade as set forth in claim 10, wherein said second section extends at an angle of between 40° and 60°, when measured from a center line of said undercut.

16. A gas turbine engine comprising:
    a fan;
    a compressor;
    a combustion section; and
    a turbine, said turbine including rotors driving said compressor and said fan, said rotors including blades, and said blades including a platform and an airfoil extending outwardly of said platform, said airfoil having a leading edge and a trailing edge, and an undercut formed on an underside of said platform, spaced away from said airfoil, said undercut being on an end of said platform adjacent said trailing edge of said airfoil, and said undercut connecting said underside of said platform to a base of said blade, said undercut having a shape with there distinct sections, a first section adjacent said underside of said platform, a second section connecting said first section to a third section adjacent said base, and said first and third sections extending along a curve, and said second section being less curved than either said first or third sections.

17. A gas turbine engine as set forth in claim 16, wherein said second section is essentially straight.

18. A gas turbine engine as set forth in claim 17, wherein said second section extends parallel to a principal stress field in said platform.

19. A gas turbine engine as set forth in claim 18, wherein said third section is a compound curve with a changing radius.

20. A gas turbine engine as set forth in claim 19, wherein said changing radius transitions from a greater radius to a smaller radius from a point connected to said second section, to a point that merges with said base.

21. A blade as set forth in claim 20, wherein a ratio of said radius of curvature of said first section compared to said radius of curvature of said third section at said point connected to said second section is between 1 and 1.25.

22. A blade as set forth in claim 20, wherein a ratio of said radius of curvature of said first section compared to said radius of curvature of said third section at said point that merges into said base is between 1.5 and 2.0.

23. A blade as set forth in claim 17, wherein said second section extends at an angle of between 40° and 60°, when measured from a center line of said undercut.

24. A method of refurbishing a turbine blade comprising:
 (1) obtaining a turbine blade to be refurbished, said turbine blade having a platform and an airfoil extending outwardly of the platform, said airfoil having a leading edge and a trailing edge; and
 (2) forming an undercut into an underside of said platform, spaced away from said airfoil, said undercut being formed on an end of said platform adjacent said trailing edge of said airfoil, and said undercut being formed to connect said underside of said platform to a base of said blade, said undercut being formed to have a shape with three distinct sections, a first section being formed adjacent said underside of said platform, and a second section formed to connect said first section to a third section formed adjacent said base, said first and second sections being cut to extend along a curve with said second section formed to have less curvature than said first and third sections.

25. A method as set forth in claim 24, wherein said second section is cut to be essentially straight.

26. A method as set forth in claim 25, wherein said second section is cut to be essentially parallel to a principal stress field in said platform.

27. A method as set forth in claim 24, wherein an undercut exists in said blade prior to the forming of step (2).

\* \* \* \* \*